Patented July 1, 1941

2,247,923

UNITED STATES PATENT OFFICE 2,247,923

RUBBER BONDED TO ARTIFICIAL SILK

Theodore A. Riehl, Akron, Ohio, assignor to Wingfoot Corporation, Wilmington, Del., a corporation of Delaware No Drawing. Application April 2, 1937, Serial No. 134,677

2 Claims. (Cl. 154—46)

This invention relates to the adhesion of rubber to artificial silk. It includes both the method and the product and particularly tires made with a carcass composed entirely or partially of artificial silk.

In the manufacture of rubber goods such as tires, belts, etc. which are reinforced by cotton fabric, there is no need for an adhesive to bind the cotton and rubber together because the fuzz on the cotton becomes embedded in the rubber. Artificial silk, however, is sheer and an adhesive is necessary to bind it to rubber. Throughout this specification the term "artificial silk" is employed to refer to any extruded cellulosic material, including cellulose acetate, viscose, etc.

The adhesive of this invention comprises two components, one of which is an adhesive for the artificial silk and the other of which is an adhesive for the rubber. A latex is used for the rubber adhesive. A condensation derivative of rubber is used as the adhesive for the artificial silk. It is also an adhesive for rubber. The latex and the rubber derivative are emulsified, the rubber derivative being present as a cement which forms the continuous phase of the emulsion, the latex forming the discontinuous phase.

The condensation derivative of rubber is preferably a product of the Pliolite type produced by treating rubber in solution with a condensing agent such as (1) chlorostannic acid, (2) the halide of an amphoteric element, or (3) a mixture of hydrochloric acid and the halide of an amphoteric element, and then after treating with the condensing agent decomposing the resulting reaction product with water. Any suitable solvent may be employed for producing the Pliolite cement which forms the continuous phase of the adhesive emulsion. Gasoline will ordinarily be employed because of its low cost.

It has been found that adhesives of this type produced from Pliolite and hevea latex increase in viscosity on standing. Possibly this is due to the swelling of the latex by the solvent of the Pliolite cement. Whatever the cause, a vulcanized latex (for example that commercially known as Vultex) has been found preferable to ordinary latex. Probably an artificial rubber such as Neoprene (formerly Duprene) or a hevea or other natural latex suitably compounded could be used equally well.

Ordinarily no emulsifying reagents are necessary for this particular "water-in-oil"-type emulsion, although the use of certain emulsifiers may be advantageous under some circumstances. It is primarily important to maintain a "water-in-oil"-type system.

The adhesive may be produced by emulsifying latex in Pliolite cement. Adhesives of the following compositions have been found satisfactory:

I

| | Parts |
|---|---|
| Revertex diluted to 40% D. R. C. | 7.5 |
| Petroleum distillate | 15.0 |
| Solvesso #3 | 9.0 |
| 30% Pliolite in Solvesso #3 | 5.0 |
| Water | 16.0 |

Solvesso #3 is marketed by Standard Oil of New Jersey and is understood to be hydrogenated petroleum product.

II

| | Parts |
|---|---|
| Revertex | 7.0 |
| Petroleum distillate | 27.0 |
| 30% Pliolite in petroleum distillate | 6.5 |

III

| | Parts |
|---|---|
| Vultex | 5.0 |
| Benzol | 25.0 |
| 30% Pliolite in petroleum distillate | 6.5 |

IV

| | Parts |
|---|---|
| Vultex | 10.0 |
| Benzol | 20.0 |
| 30% Pliolite in petroleum distillate | 6.5 |
| 67% casein solution | 3.0 |

V

| | Parts |
|---|---|
| Vultex | 10.0 |
| Benzol | 20.0 |
| 30% Pliolite in petroleum distillate | 6.5 |
| 67% casein solution | 5.0 |

VI

| | Parts |
|---|---|
| Revertex diluted to 40% D. R. C. | 10.0 |
| 30% Pliolite in petroleum distillate | 3.0 |
| Petroleum distillate | 5.0 |
| Benzol | 4.5 |
| 25% rosin in benzene | 3.0 |

In the manufacture of artificial silk tires, belts, etc. it has been found desirable to use an adhesive between the rubber and the artificial silk and the adhesives described above have proved very satisfactory for this purpose. In making the tires the fabric is treated with the adhesive. This may be done by treating the individual cords, etc. with the adhesive before making them into the fabric or the finished fabric may be treated. After evaporation of the solvent the fabric is incorporated in the tire and subjected to vulcanization, etc. in the known manner.

I claim:

1. In a rubber article comprising artificial silk, the improvement which comprises between the rubber and artificial silk a vulcanized bond formed from a water-in-oil emulsion of a latex in a hydrocarbon-solvent solution of a condensation derivative of rubber produced by treating rubber with the halide of amphoteric metal.

2. In an artificial silk tire, the improvement which comprises between the artificial silk and the rubber a bond formed by vulcanization of a water-in-oil emulsion of a latex in a hydrocarbon-solvent solution of a condensation derivative of rubber produced by the treatment of rubber with a halide of an amphoteric metal.

THEODORE A. RIEHL.